(12) United States Patent
Ishii et al.

(10) Patent No.: US 11,535,437 B2
(45) Date of Patent: Dec. 27, 2022

(54) GAS BARRIER FILM

(71) Applicant: TOPPAN PRINTING CO., LTD., Tokyo (JP)

(72) Inventors: Ryoji Ishii, Tokyo (JP); Takeshi Nishikawa, Tokyo (JP); Tadashi Hongo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 200 days.

(21) Appl. No.: 16/144,399

(22) Filed: Sep. 27, 2018

(65) Prior Publication Data

US 2019/0023468 A1    Jan. 24, 2019

Related U.S. Application Data (63) Continuation of application No. PCT/JP2017/012694, filed on Mar. 28, 2017.

(30) Foreign Application Priority Data

Apr. 1, 2016  (JP) .............................. JP2016-074559
Oct. 3, 2016  (JP) .............................. JP2016-195590

(51) Int. Cl.
  *B65D 65/40*    (2006.01)
  *B32B 27/36*    (2006.01)
  (Continued)

(52) U.S. Cl.
  CPC ................ *B65D 65/40* (2013.01); *B32B 9/00* (2013.01); *B32B 27/36* (2013.01); *C08J 7/043* (2020.01);
  (Continued)

(58) Field of Classification Search
  None
  See application file for complete search history.

(56) References Cited

U.S. PATENT DOCUMENTS 5,589,252 A  *  12/1996  Matsuo ..................... B05D 7/04
                                                    428/216
7,763,335 B2      7/2010  Oshita et al.
(Continued)

FOREIGN PATENT DOCUMENTS

JP    H08-318591 A      12/1996
JP    2001-232739 A  *   8/2001
(Continued)

OTHER PUBLICATIONS

International Search Report regarding Int'l. Appl. No. PCT/JP2017/012694, dated Jun. 27, 2017, 2 pps.
(Continued)

*Primary Examiner* — Vivian Chen
(74) *Attorney, Agent, or Firm* — Foley & Lardner LLP (57) ABSTRACT

A gas barrier film that includes at least a film base material including a polyester resin having a butylene terephthalate unit as a main constituent unit, and one or more metal oxide layers wherein the gas barrier film has a heat shrinkage rate in the machine direction (MD direction) after heating for 30 minutes at 150° C. of 0.6% or more but less than 3.0%, the heat shrinkage rate being represented by the following formula: Heat shrinkage rate={(Length before heating−Length after heating)/Length before heating}×100(%).

12 Claims, 6 Drawing Sheets

(51) Int. Cl.
- B32B 9/00 (2006.01)
- C08J 7/04 (2020.01)
- C08J 7/043 (2020.01)
- C08J 7/048 (2020.01)
- B05D 7/04 (2006.01)
- C08L 83/02 (2006.01)
- C09D 183/02 (2006.01)
- C09D 129/04 (2006.01)
- C08L 29/04 (2006.01)

(52) U.S. Cl.
CPC .............. C08J 7/048 (2020.01); C08J 7/0423 (2020.01); B05D 7/04 (2013.01); B32B 2255/10 (2013.01); B32B 2255/20 (2013.01); B32B 2255/26 (2013.01); B32B 2255/28 (2013.01); B32B 2307/50 (2013.01); B32B 2307/7242 (2013.01); B32B 2307/7244 (2013.01); B32B 2307/7246 (2013.01); B32B 2307/734 (2013.01); B32B 2367/00 (2013.01); B32B 2439/70 (2013.01); B32B 2439/80 (2013.01); C08J 2367/02 (2013.01); C08J 2367/03 (2013.01); C08J 2429/04 (2013.01); C08J 2483/02 (2013.01); C08L 29/04 (2013.01); C08L 83/02 (2013.01); C08L 2201/14 (2013.01); C08L 2203/16 (2013.01); C09D 129/04 (2013.01); C09D 183/02 (2013.01); Y10T 428/31786 (2015.04)

(56) References Cited

U.S. PATENT DOCUMENTS

| | | | | |
|---|---|---|---|---|
| 8,642,715 | B2 * | 2/2014 | Hashimoto | C08J 7/08 528/308.1 |
| 10,696,017 | B2 * | 6/2020 | Tokinoya | B32B 27/30 |
| 2002/0129848 | A1 * | 9/2002 | Miura | B32B 7/12 136/251 |
| 2003/0068511 | A1 * | 4/2003 | Murschall | B32B 27/36 428/480 |
| 2005/0100723 | A1 * | 5/2005 | Tanaka | C08L 2666/18 428/220 |
| 2005/0131162 | A1 * | 6/2005 | Tanaka | B32B 27/06 525/329.7 |
| 2007/0009750 | A1 * | 1/2007 | Ito | B65D 65/02 428/458 |
| 2009/0139564 | A1 * | 6/2009 | Miyaji | H01L 31/049 136/251 |
| 2009/0242026 | A1 * | 10/2009 | Miyaji | B32B 27/08 136/256 |
| 2010/0120946 | A1 * | 5/2010 | Kliesch | B29C 48/91 523/400 |
| 2010/0256261 | A1 * | 10/2010 | Kliesch | C08G 59/027 523/427 |
| 2011/0008635 | A1 * | 1/2011 | Kliesch | B32B 7/02 428/480 |
| 2011/0104437 | A1 * | 5/2011 | Yamamura | C23C 14/20 428/141 |
| 2012/0231267 | A1 * | 9/2012 | Ootake | C09J 7/50 428/336 |
| 2014/0370275 | A1 * | 12/2014 | Kuchiyama | G06F 3/041 428/336 |
| 2015/0299406 | A1 | 10/2015 | Gotou et al. | |
| 2017/0088682 | A1 * | 3/2017 | Goto | C08J 5/18 |
| 2018/0099451 | A1 * | 4/2018 | Goto | C08J 7/048 |
| 2021/0198477 | A1 * | 7/2021 | Goto | B32B 9/00 |

FOREIGN PATENT DOCUMENTS

| | | | |
|---|---|---|---|
| JP | 2004-162046 | A | 6/2004 |
| JP | 2005-097560 | A | 4/2005 |
| JP | 2006-007566 | A | 1/2006 |
| JP | 2006-082319 | A * | 3/2006 |
| JP | 2006-082319 | A | 3/2006 |
| JP | 2007-196550 | A * | 8/2007 |
| JP | 2007-196550 | A | 9/2007 |
| JP | 2009-202390 | A | 9/2009 |
| JP | 2010-000678 | A | 1/2010 |
| JP | 2011-143714 | A | 7/2011 |
| JP | 2012-214248 | A | 11/2012 |
| JP | 2013-208915 | A | 10/2013 |
| JP | 2015-150836 | A | 8/2015 |
| WO | WO 03/091317 | | 11/2003 |
| WO | WO 2005/053954 | | 12/2007 |
| WO | WO 2009/154150 | | 12/2009 |
| WO | WO-2014/077197 | A1 | 5/2014 |

OTHER PUBLICATIONS

Office Action dated Apr. 1, 2021 for corresponding European Patent Application No. 17775111.2.

Statement of Opposition to the Grant of a Patent for Japanese Patent No. 6879292, dated Sep. 14, 2021, (100 pages).

* cited by examiner

GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/012694, filed on Mar. 28, 2017, which is based upon and claims the benefit of priority to Japanese Patent Application Nos. 2016-074559, filed on Apr. 1, 2016, and 2016-195590, filed on Oct. 3, 2016, the disclosures of which are all hereby incorporated herein by reference in their entireties.

TECHNICAL FIELD

The present disclosure relates to a gas barrier film.

BACKGROUND ART

Packaging for food products, pharmaceutical products, and the like require a high degree of air tightness, and in order to prevent deterioration of the packaged contents due to moisture or oxygen, packaging materials using materials such as various kinds of plastic film, metal foil, paper and the like are being developed. Particularly, as a form of packaging for food products and pharmaceuticals that can be stored for a long period of time, retort packaging or boil-in-bag packaging that has undergone heat sterilization processing such as retort sterilization, boiling sterilization and the like is typically used. Examples of characteristics required for retort packaging and boil-in-bag packaging include various gas barrier properties, hot water resistance, aroma retention, color fastness, impact resistance, pressure resistance, puncture resistance, bending resistance and the like; and the packaging is designed to have a laminate configuration that is suitable for heat processing conditions and for the packaged contents.

As an example, first, a gas barrier film is produced by laminating together a biaxially oriented polyethylene terephthalate (PET) film as a base material for providing hot water resistance, aroma retention, printability and the like; a biaxially oriented nylon (ONY) film for providing impact resistance and puncture resistance; and aluminum (Al) foil or vapor deposited film as a gas barrier layer for providing barrier properties.

A packaging material suitable for heat processing is then further obtained by using a dry lamination method to adhere together a heat-resistant grade unstretched polypropylene (CPP) film, polyethylene film or the like as a sealant for providing a heat sealing property and the gas barrier film coated with adhesive.

Retort processing is a general method of performing pressure sterilization against microorganisms such as mold, yeast, bacteria and the like for preserving food products and the like. Normally, gas barrier laminate type of packaging material that packages a food product is pressure sterilized for 10 to 120 minutes under conditions of 105 to 140° C. and 0.15 to 0.30 MPa. There are steam type retort apparatuses that utilize heating steam, and there are hot-water type retort apparatuses that utilize pressurized heating water; with each type being appropriately used according to the sterilization conditions of the food product contents. Boiling processing is a method of performing moist-heat sterilization for preserving food products and the like. Normally, depending on the packaged contents, gas barrier laminate type of packaging material that packages a food product or the like is moist-heat sterilized for 10 to 120 minutes under conditions of 60 to 100° C. and atmospheric pressure. Normally, boiling processing is performed at a temperature of 100° C. or lower using a hot-water tank. As the method used, there is a batch type method of immersing a package in a hot-water tank at a constant temperature and removing the package after processing has been performed for a set amount of time, and there is a continuous method by which a package is treated by passing the package through a hot-water tank using a tunnel method.

For example, in order to perform hot-water pressure sterilization processing under the conditions of 105° C. to 130° C., 0.10 to 0.30 MPa pressure, and 10 to 60-minute processing time as hot-water pressure sterilization type retort processing, a gas barrier laminate packaging material with a laminate configuration composed of layers starting from the outside of PET/Al/ONY/CPP, PET/ONY/Al/CPP, or PET/vapor deposition layer/ONY/CPP is used. PET film and ONY film are typically used in combination in this way.

On the other hand, Patent Literature 1 proposes using polybutylene terephthalate (PBT) in development of a retort packaging material with PBT/Al/CPP laminate configuration. Moreover, in order to improve the gas barrier properties after retort processing, a polymer that includes a highly hydrophilic strong hydrogen bonding group in the molecule, typified by poly(meth)acrylic acid or polyvinyl alcohol, is used. However, even though a retort packaging material with that kind of configuration has very excellent gas barrier properties for oxygen and the like in dry conditions, in wet conditions there is a problem in that the gas barrier properties for oxygen and the like are greatly reduced due to the hydrophilicity, and there is also a problem in that degradation of the resistance to humidity and hot water occurs.

In order to solve these problems, neutralizing a carboxyl group of a polycarboxylic acid polymer with polyvalent metal ions is proposed. For example, Patent Literature 2 discloses placing a precursor film, which includes a polycarboxylic acid polymer and a polyvalent metal compound in the same layer or in adjacent layers, and which has a peak ratio at a specific wavelength in the infrared absorption spectrum of less than 0.25, in an atmosphere having relative humidity of 20% or more to form a polyvalent salt of a polycarboxylic acid polymer and obtain a film of which the peak ratio is 0.25 or greater.

Patent Literature 3 discloses a gas barrier laminate having layers that include: a polymer having a functional group selected from a carboxyl group and a carboxylic acid anhydride, where at least part of the —COO— group of the functional group is neutralized with polyvalent metal ions; and a hydrolysis condensate of a compound that includes a metal atom bonded to at least one characteristic group selected from a halogen atom and an alkoxy group.

CITATION LIST

Patent Literature

[PTL1] JP 2012-214248 A; [PTL2] WO 03/091317 A1; [PTL3] WO2005/053954 A1.

SUMMARY OF THE INVENTION

Technical Problem

As described above, typically both PET film and ONY film are used in combination as a packaging material laminate configuration for heat processing, and particularly retort processing. This is because PET film has an advantage of having high hot-water resistance while having a disadvantage of having low puncture strength, and ONY film has an advantage of having high puncture strength while having a disadvantage of low hot-water resistance, so by being used together, they complement the advantages and disadvantages of each other. However, since both PET and ONY are used, the laminating processes increase, there is a concern about the impact on the environment, and improvement from the aspect of cost is also required.

A first aspect according to the present disclosure is providing a gas barrier film that, together with being capable of maintaining sufficiently high or even excellent gas barrier properties even when hot-water processing such as retort processing and the like is performed, also has sufficiently high or even excellent puncture strength and strength against physical impact even without using both PET and ONY layers for complementing their advantages. A second aspect according to the present disclosure is providing a gas barrier film that, together with being capable of maintaining sufficiently high or even excellent gas barrier properties even when hot-water processing such as retort processing and the like is performed, also has sufficiently high or even excellent strength against physical impact even without using both PET and ONY layers for complementing their advantages.

Intended Solution to Problem

The gas barrier film according to a first aspect of the present disclosure includes at least a film base material including a polyester resin having a butylene terephthalate unit as a main constituent unit, and one or more metal oxide layers, wherein the gas barrier film has a heat shrinkage rate in the machine direction (MD direction) after heating for 30 minutes at 150° C. of 0.6% or more but less than 3.0%, the heat shrinkage rate being represented by the following formula:

Heat shrinkage rate={(Length before heating−Length after heating)/Length before heating}×100(%)

The gas barrier film according to a first aspect of the present disclosure includes at least a film base material including a polyester resin having a butylene terephthalate unit as a main constituent unit, one or more metal oxide layers, and a gas barrier protective layer formed on top of the metal oxide layer, wherein the gas barrier film has a tensile elasticity modulus within a range of 2.0 to 4.0 GPa, and a heat shrinkage rate in the machine direction (MD direction) after heating for 30 minutes at 150° C. of less than 3.0%, the heat shrinkage rate being represented by the following formula:

Heat shrinkage rate={(Length before heating−Length after heating)/Length before heating}×100(%)

In the gas barrier film according to the above-described second aspect, the gas barrier protective layer preferably includes a water-soluble polymer, and at least one selected from a group consisting of (a) one or more kinds of metal alkoxide and a hydrolyzate thereof, and (b) tin chloride. Incidentally, the gas barrier film according to the above-described first aspect may also further include a gas barrier protective layer similar to this on top of the metal oxide layer.

According to the present disclosure, at least one layer of the metal oxide layer preferably includes at least one of Al and Si.

According to the present disclosure, the thickness of the film base material is preferably no less than 6 μm and no greater than 200 μm, and the puncture strength of the film base material is preferably 8.5 N or more.

Desired Effect of Invention

According to the first aspect of the present disclosure, a gas barrier film is provided that is capable of reducing the number of laminating processes during manufacturing, and together with being able to reduce the environmental burden and burden from a cost aspect, has hot-water resistance, sufficiently high puncture strength, sufficiently high strength against physical impact, and can maintain sufficiently high or even excellent gas barrier properties even when hot-water processing such as retort processing, boiling processing and the like is performed. According to the second aspect of the present disclosure, a gas barrier film is provided that is capable of reducing the number of laminating processes during manufacturing, and together with being able to reduce the environmental burden and burden from a cost aspect, has hot-water resistance, sufficiently high strength against physical impact, and can maintain sufficiently high or even excellent gas barrier properties even when hot-water processing such as retort processing, boiling processing and the like is performed.

DESCRIPTION OF REPRESENTATIVE EMBODIMENTS

With reference to the drawings, gas barrier films according to embodiments of the present invention will be described. It is to be understood that the present invention is not limited to the following embodiments, which are intended to be representative of the present invention. The representative embodiments described below are merely examples of the present invention, and the design thereof could be appropriately changed by one skilled in the art. In the embodiments, the same or corresponding components are denoted by the same reference characters, and duplicate description thereof will be omitted. Incidentally, unless there is a reason for the sake of convenience, the same reference signs will be used for identical components, and redundant explanations will be omitted. Moreover, in the drawings, the scale of the each of the components is appropriately changed in order to make each component a recognizable size.

First Embodiment

Figure 1:
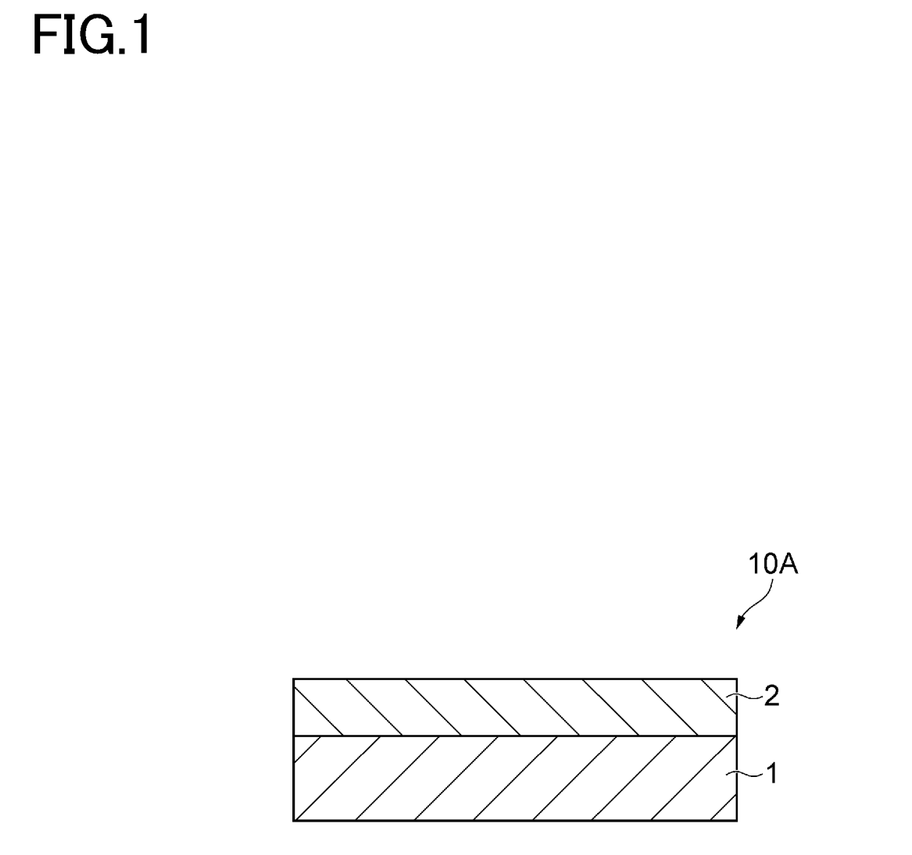
FIG. 1 is a cross-sectional view schematically illustrating a first embodiment of a gas barrier film according to the present disclosure.
Figure 2:
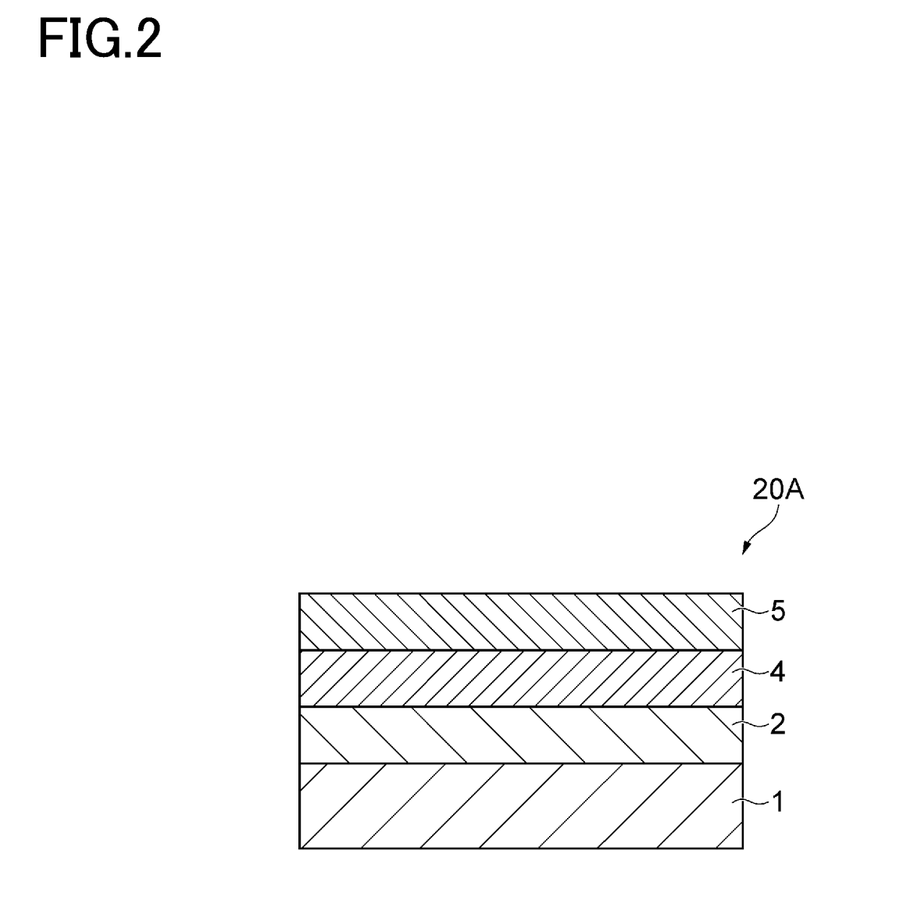
FIG. 2 is a cross-sectional view schematically illustrating an example of a gas barrier laminate that includes the gas barrier film illustrated in FIG. 1.

The gas barrier film 10A illustrated in FIG. 1 includes a film base material 1 and at least one metal oxide layer 2 formed on the surface of the film base material 1. Here, the film base material 1 contains a polyester resin having a butylene terephthalate unit as a main constituent unit. The metal oxide layer 2 is a layer having gas barrier properties. The gas barrier laminate 20A illustrated in FIG. 2 has a configuration in which a sealant 5 is laminated on the surface of the metal oxide layer 2 of the gas barrier film 10A with an adhesive layer 4 interposed therebetween.

In this embodiment, a polyester resin having a butylene terephthalate unit as a main constituent unit means that 90 mol % or more of a repeating unit formed by bonding a dicarboxylic acid component and a glycol component of the resin is composed of the butylene terephthalate unit.

A feature of the gas barrier film 10A is that the heat shrinkage rate in the machine direction (MD) after heating for 30 minutes at 150° C. is 0.6% or more, but less than 3.0%. The heat shrinkage rate is calculated by the following formula:

$$\text{Heat shrinkage rate} = \{(\text{Length before heating} - \text{Length after heating})/\text{Length before heating}\} \times 100 (\%)$$

By making the heat shrinkage rate of the gas barrier film 10A less than 3.0%, damage to the gas barrier layer due to heat shrinkage can be prevented, and as a result, sufficiently high or even excellent gas barrier properties are exhibited even after hot-water processing. On the other hand, by making the heat shrinkage rate 0.6% or more, flexibility of the barrier film can be maintained, and the impact resistance as a packaging material is sufficiently high or even excellent.

Figure 3:
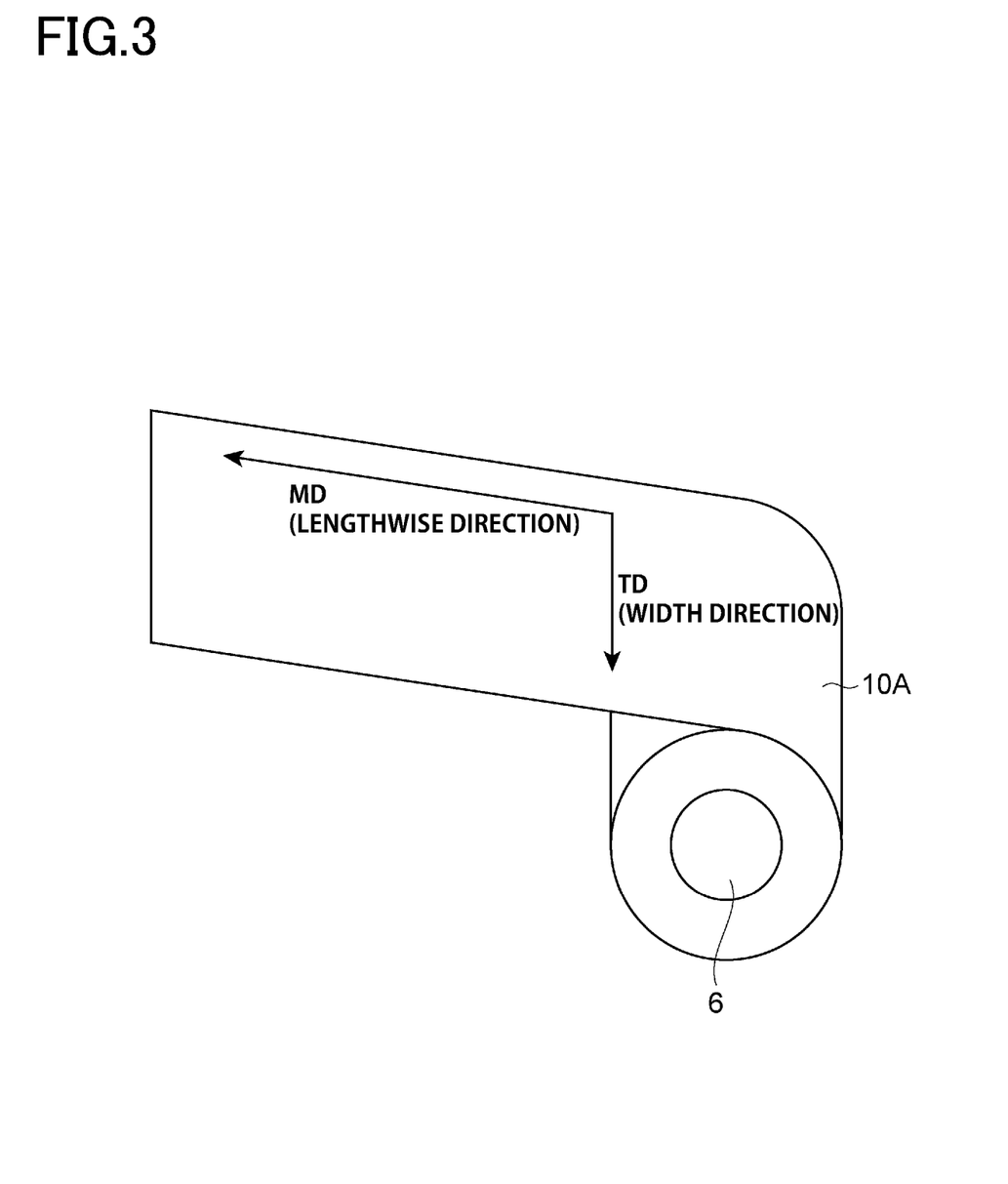
FIG. 3 is a schematic view for explaining the lengthwise direction (MD) and the width direction (TD) of a gas barrier film.

FIG. 3 is an explanatory view for explaining the lengthwise direction and the width direction of a gas barrier film, and illustrates a state in which the gas barrier film 10A in a rolled-up state is mounted in an unwinding unit 6. In the present disclosure it is presumed that gas barrier film is produced by a winding-roll method, and the machine direction (MD) is taken to be the lengthwise direction. Conversely, the transverse direction (TD) perpendicular to the lengthwise direction is taken to be the width direction. Incidentally, MD is the abbreviation for Machine Direction, and TD is the abbreviation for Transverse Direction.

The heat shrinkage rate in the MD direction of the gas barrier film 10A can be adjusted, for example, by controlling the heat shrinkage rate of the film base material 1 by controlling the degree of stretching when stretching the film base material 1 and/or the degree of crystallization due to the heat setting temperature, by the thickness of the barrier layer (layer that includes the metal oxide layer 2), and the like.

The above-mentioned polyester resin included in the film base material 1 is preferably polybutylene terephthalate or a mixed material of polybutylene terephthalate and polyethylene terephthalate that includes polybutylene terephthalate at 60% by mass or more. When the amount of polybutylene terephthalate is less than 60% by mass, the impact strength and the pinhole resistance decrease easily and tend to be insufficient as film properties. In addition, the film base material 1 may undergo biaxial or uniaxial stretching, however, in order to provide thermal stability, biaxial stretching is more preferable.

By using a polyester resin that is a mixed material of polybutylene terephthalate and polyethylene terephthalate, the puncture strength is also improved. For example, according to JP 2002-179892 A, even though a film is a blended film of polyester resin mainly composed of polyethylene terephthalate (PET) and a polyester resin mainly composed of polybutylene terephthalate (PBT), by having crystals with an independent PET phase and PBT phase, a polyester film having strong puncture strength can be obtained by having both hot-water resistance and flexibility.

In order to obtain the above-mentioned independent crystals, the crystals can be individually melted when producing the polyester film, and can be confirmed by individually detecting the crystal melting peaks using a differential scanning calorimeter (DSC). The crystal peak of the PBT phase appears on the low-temperature side, and then the crystal peak of the PET phase appears. By using these two polyester resins, PET and PBT, individual crystal melting occurs while maintaining compatibility to the extent that there is fusing during glass transition, so it is possible to obtain the advantages of both the PET phase and the PBT phase.

The thickness of the film base material 1 is not particularly limited. The puncture strength improves the thicker the film base material 1 is, and depending on the use, a film thickness of about 6 μm to 200 μm can be suitably used. Particularly, a film base material having a puncture strength measurement of 8.5 N or more as specified in JIS Z1707 can be suitably used for forming a packaging material having puncture resistance.

The inventors have found that in polyester film base material as described above, by keeping the heat shrinkage rate within a specified range and further laminating a barrier layer that includes a metal oxide layer on the surface thereof, a gas barrier film having high hot-water resistance, puncture strength, and strength against physical impact, and that is capable of maintaining sufficiently high or even excellent gas barrier properties even when hot-water processing such as boiling processing is performed, can be achieved.

The film base material 1 may undergo various pretreatments such as corona treatment, plasma treatment, frame treatment and the like, or may be provided with an anchor coat layer such as an easy adhesion layer. In addition, applying a separate planarization layer in order to reduce unevenness in the film base material 1 would pose no problem.

Examples of a coating agent for an anchor coat layer or planarization layer include, for example, acrylic resin, epoxy resin, acrylic urethane resin, polyester polyurethane resin, and polyether polyurethane resin. Among these coating agents, acrylic urethane resin and polyester polyurethane resin are preferred from the aspect of heat resistance and interlayer adhesion strength.

The coating method for coating the coating agent on the film base material 1 is not particularly limited, and a known coating method can be used; examples may include an immersion method (dipping method), or methods that use a sprayer, a coater, a printer, a brush, or the like. In addition, examples of the types of coaters and printers used in these methods, and the coating methods thereof may include a gravure coater, a reverse-roll coater, a micro gravure coater, a combined chamber and doctor coater, an air-knife coater, a dip coater, a bar coater, a comma coater, a die coater, and the like for a direct gravure method, a reverse gravure method, a kiss reverse gravure method, an offset gravure method, and the like.

As the coating amount of the coating agent, preferably the mass per square meter after coating and drying the coating agent is 0.01 to 10 g/m$^2$, and more preferably 0.03 to 5 g/m$^2$.

When the mass per square meter after coating and drying the coating agent is less than the above-mentioned lower limit, film formation tends to be insufficient, and on the other hand, when it exceeds above-mentioned upper limit, drying tends to be insufficient, and it becomes easy for solvent to remain.

Preferably the metal oxide layer 2 includes at least one of Al and Si. More specifically, a metal oxide that is represented by $SiO_x$ or $AlO_x$, or a mixture thereof can be used; however, there is no problem even in the case where the metal oxide includes single atoms of nitrogen or aluminum.

The film thickness of the metal oxide layer 2 is preferably no less than 5 nm and no greater than 100 nm. When the film thickness is less than 5 nm, there is a tendency that it will not be possible to obtain sufficient water vapor barrier properties. Moreover, when the film thickness is greater than 100 nm, there is a tendency for cracking to occur due to deformation caused by internal stress inside the thin film, and the water vapor barrier properties tend to decrease. Furthermore, the cost increases due to an increase in the amount of material used, an increase in the length of the film formation time and the like, which is not preferable from an economic aspect.

At least one layer of the metal oxide layer 2 is formed by vacuum film formation. In vacuum film formation, a physical vapor deposition method or a chemical vapor deposition method can be used. Examples of a physical vapor deposition method include, but are not limited to, a vacuum vapor deposition method, a sputtering method, an ion plating method, and the like. Examples of a chemical vapor deposition method include, but are not limited to, a thermal CVD method, a plasma CVD method, a photo CVD method, and the like.

In the vacuum film formation, using a resistive heating type vacuum deposition method, an Electron Beam (EB) heating type vacuum deposition method, an induction heating type vacuum deposition method, a sputtering method, a reactive sputtering method, a dual-magnetron sputtering method, a plasma chemical vapor deposition method (PECVD method), and the like is particularly preferred.

Plasma is used in a method after the sputtering method; and a plasma generating method such as a Direct Current (DC) method, Radio Frequency (RF) method, Medium Frequency (MF) method, DC pulse method, RF pulse method, DC+RF superposition method and the like can be applied.

In the case of the sputtering method, a negative potential gradient occurs in the target that is the cathode, and Ar ions receive potential energy and collide with the target. Here, sputtering cannot be performed unless a negative self-bias potential occurs even when plasma is generated. Microwave (MW) plasma is not suitable for sputtering because a self-bias does not occur. However, in the PECVD method, the chemical reaction and deposition process are advanced by taking advantage of the gas-phase reaction in plasma, so the film can be formed even when there is no self-bias, and MW plasma can be used.

A protective layer (not illustrated) may be provided on the metal oxide layer 2. When a protective layer is provided on the metal oxide layer 2, high gas barrier properties can be achieved by a synergistic effect with the metal oxide layer 2, and both layers combine to become a gas barrier layer. Specifically, an organic film or an inorganic film may be used as the protective layer, and an organic and inorganic hybrid film may also be used. In the case of using an organic film, a film having an acrylic, epoxy, urethane structure or the like is desired, and in the case of using an inorganic film, it is preferable that the metal oxide precursor be cured.

In the case of employing an organic film protective layer, the protective layer (gas barrier protective layer) can be formed, for example, by applying a coating liquid having the composition described below on the metal oxide layer 2, then heating and drying the coating liquid. In other words, the coating liquid for forming the protective layer is prepared by adding a component having a formula $(R^1Si(OR^2)_3)n$ ($R^1$ is an organic functional group, and $R^2$ is $CH_3$, $C_2H_5$, or $C_2H_4OCH_3$) to a liquid that includes a water-soluble polymer, one or more kind selected from a group consisting of (a) one or more kind of metal alkoxide and a hydrolyzate thereof, and (b) tin chloride, and a solvent (water or a water/alcohol mixture). The components included in the coating liquid for forming the protective layer will be explained in detail below.

Examples of the water-soluble polymer may include polyvinyl alcohol, polyvinyl pyrrolidone, starch, methyl cellulose, carboxymethyl cellulose, sodium alginate, and the like. Of these, polyvinyl alcohol (hereinafter abbreviated as PVA) has the most excellent gas barrier properties for the obtained gas barrier layer, so is particularly preferred. PVA referred to here is generally obtained by saponification of polyvinyl acetate, and for example, a complete PVA and the like in which only a few percent of an acetic acid group remains from a so-called partially saponified PVA in which several tens percent of the acetic acid group remains can be used.

The metal alkoxide is a compound that is represented by the general formula: M(OR)n (M is a metal such as Si, Ti, Al, Zr and the like, and R is an alkyl group such as $CH_3$, $C_2H_5$ and the like); and specific examples may include tetraethoxysilane $\{Si(OC_2H_5)_4\}$, triisopropoxy aluminum $\{Al(O\text{-}2'\text{-}C_3H_7)_3\}$, and the like. Among these as well, tetraethoxysilane and triisopropoxy aluminum are relatively stable in aqueous solvent after hydrolysis, so are preferred.

It is also possible to appropriately add as necessary known additives such as an isocyanate compound, a silane coupling agent, a dispersant, a stabilizer, a viscosity modifier, a coloring agent and the like to a coating liquid for forming a protective layer composed of these kinds of constituent materials to an extent that the gas barrier properties are not impaired.

Water resistance can be provided by adding a compound expressed by the formula (R1Si(OR2)3)n. The organic functional group (R1) is preferably a nonaqueous functional group such as vinyl, epoxy, methacryloxy, ureido, isocyanate and the like. A nonaqueous functional group is a hydrophobic functional group, so the water resistance is further improved.

In the case where the compound represented by the formula $(R^1Si(OR^2)_3)n$ is a polymer, preferably the compound is a trimer, and more preferably is 1,3,5-tris (3-trialkoxysilylalkyl) isocyanurate. This is a condensation polymer of 3-isocyanate alkyl alkoxysilane. This 1,3,5-tris (3-trialkoxysilylalkyl) isocyanurate has no chemical reactivity in the isocyanate moiety, but is known for ensuring reactivity by the polarity of the isocyanurate ring moiety. Generally, like 3-isocyanate alkyl alkoxysilane, 1,3,5-tris (3-trialkoxysilylalkyl) isocyanurate is added to an adhesive or the like, and is known as an adhesion improving agent. Therefore, by adding 1,3,5-tris (3-trialkoxysilylalkyl) isocyanurate to a water-soluble polymer having the hydroxyl group, the water resistance of the gas barrier layer can be improved by hydrogen bonding. Even though 3-isocyanate alkyl alkoxysilane has high reactivity and low liquid stability, the isocyanurate ring moiety of 1,3,5-tris (3-trialkoxysilylalkyl) isocyanurate is not water soluble due to the polarity, however, 1,3,5-tris (3-trialkoxysilylalkyl) isocyanurate is easily dispersed in an aqueous solution, and the viscosity can be stably maintained. In addition, the water resistance performance of 3-isocyanate alkyl alkoxysilane is equivalent to that of 1,3,5-tris (3-trialkoxysilylalkyl) isocyanurate.

Some 1,3,5-tris (3-trialkoxysilylalkyl) isocyanurate is produced by thermal condensation of 3-isocyanate alkyl alkoxysilane and in some cases 3-isocyanate alkyl alkoxysilane of the base material is included, however this poses no particular problem. More preferable is 1,3,5-tris (3-trialkoxysilylpropyl) isocyanurate, and even more preferable is 1,3,5-tris (3-trimethoxysilylpropyl) isocyanurate. 1,3,5-tris (3-trimethoxysilylpropyl) isocyanurate is practically advantageous because this methoxy group has a fast hydrolysis rate, and those including a propyl group can be obtained at a comparatively low price.

In the case where the formula $(R^1Si(OR^2)_3)n$ is converted to $R^2Si(OH)_3$, the solid content of $R^2Si(OH)_3$ is preferably 1 to 50% by mass with respect to the total solid content. When this amount is less than 1% by mass, the water resistance effect tends to become low, and when the amount is greater than 50% by mass, the gas barrier properties tend to decrease because the functional groups become holes in the gas barrier layer. In order to obtain the required water resistance and gas barrier properties for boiling or retort sterilization, the above-mentioned solid content with respect to the total solid content is more preferably 5 to 30% by mass.

As the coating method for applying the above-mentioned coating liquid it is possible to use a known method such as a normally used casting method, a dipping method, a roll coating method, a gravure coating method, a screen printing method, a reverse coating method, a spray coating method, a kit coating method, a die coating method, a metering bar coating method, a combined chamber and doctor coating method, a curtain coating method and the like.

The thickness of the gas barrier layer to which a protective layer is added is also not particularly limited. The thickness may be appropriately determined according to the intended use. In the case where the thickness after drying is 0.01 μm or less, it is difficult to obtain a uniform coating film, and it may not be possible to obtain sufficient gas barrier properties, so such a thickness is not preferred. Moreover, in the case where the thickness is greater than 50 μm a problem may occur in that cracking easily occurs in the coating film. Preferably, the thickness is within the range 0.01 to 50 μm.

Second Embodiment

Figure 4:
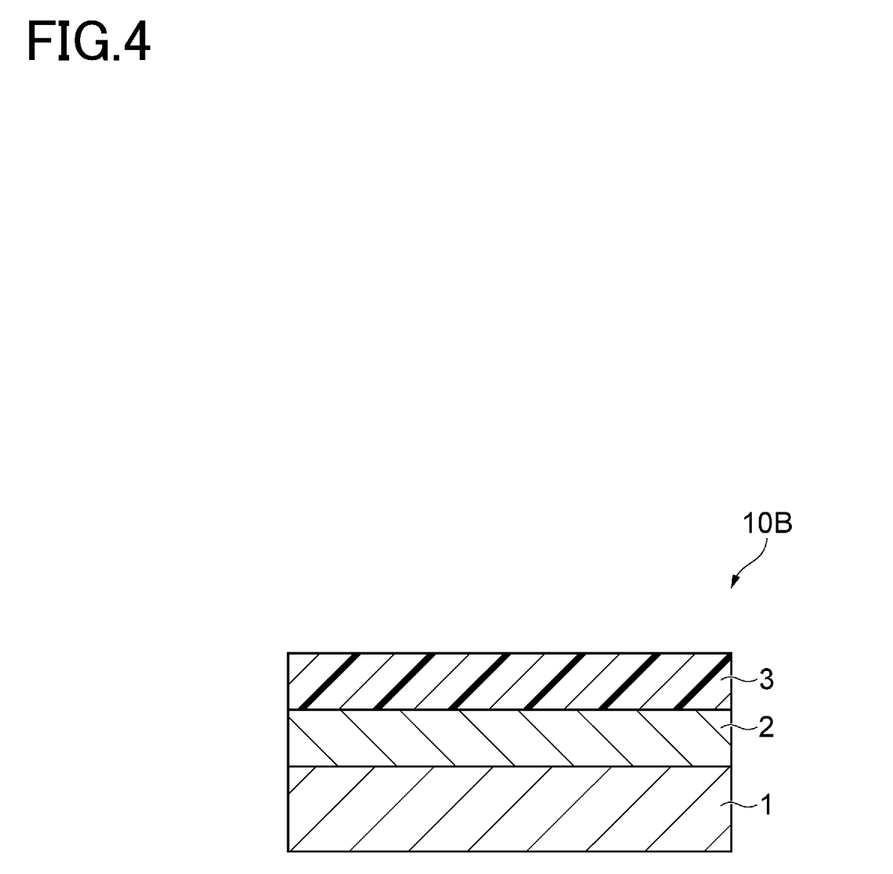
FIG. 4 is a cross-sectional view schematically illustrating a second embodiment of a gas barrier film according to the present disclosure.
Figure 5:
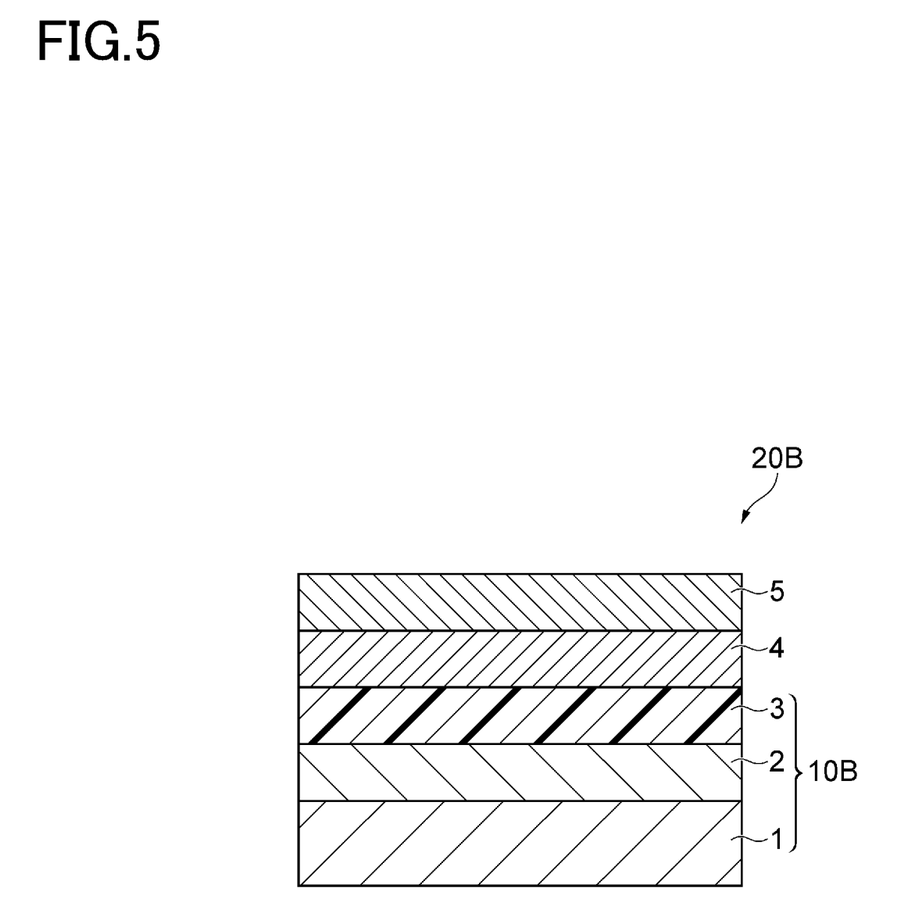
FIG. 5 is a cross-sectional view schematically illustrating an example of a gas barrier laminate that includes the gas barrier film illustrated in FIG. 4.

The gas barrier film 10B illustrated in FIG. 4 includes a film base material 1, one or more metal oxide films 2 formed on the surface of the film base material 1, and further, a gas barrier protective layer 3 formed on the surface of the metal oxide layer 2. The gas barrier laminate 20B illustrated in FIG. 5 has a configuration in which a sealant 5 is further laminated on the gas barrier protective layer 3 of the gas barrier film 10B via an adhesive layer 4. Here, the film base material 1 includes a polyester resin having a butylene terephthalate unit as the main constituent unit. The metal oxide layer 2 is a layer having gas barrier properties. In the following, the second embodiment will be explained mainly focusing on the differences with the first embodiment described above.

In this embodiment, a polyester resin having a butylene terephthalate unit as a main constituent unit means that 60% by mass or more of a repeating unit formed by bonding a dicarboxylic acid component and a glycol component of the resin is composed of the butylene terephthalate unit.

A feature of the gas barrier film 10B is that the tensile elasticity modulus is 2.0 to 4.0 GPa. The tensile elasticity modulus of the gas barrier film 10B is preferably 2.5 to 3.0 GPa. This is the average value in the MD direction and the TD direction. When this tensile elasticity modulus is less than 2 GPa, the film stretches easily and wrinkling tends to occur when processing the metal oxide layer 2 and the gas barrier protective layer 3, so problems in processing readily occur. On the other hand, flexibility decreases the higher the tensile elasticity modulus is, so when the tensile elasticity modulus is greater than 4.0 GPa, the mechanical strength such as the puncture strength, dropped bag strength and the like decreases.

The average tensile elasticity modulus in the MD direction and TD direction of the gas barrier film 10B can be adjusted, for example, by controlling the tensile elasticity modulus of the film base material 1 by the mixing ratio and the like of the polybutylene terephthalate and polyethylene terephthalate of the film base material 1, the thickness of the barrier layer (layer including the metal oxide layer 2 and gas barrier protective layer 3), and the like.

A feature of the gas barrier film 10B is that the heat shrinkage rate in the machine direction (MD) after heating for 30 minutes at 150° C. is less than 3.0%. The heat shrinkage rate is calculated by the following formula:

Heat shrinkage rate={(Length before heating−Length after heating)/Length before heating}×100(%)

By making the heat shrinkage rate of the gas barrier film 10B less than 3.0%, damage to the gas barrier layer due to heat shrinkage can be prevented, and as a result, sufficiently high or even excellent gas barrier properties are exhibited even after hot-water processing. In the gas barrier 10B, preferably the heat shrinkage rate of the gas barrier film in the machine direction (MD) after heating for 30 minutes at 150° C. is 0.6% or more. By making the heat shrinkage rate 0.6% or more, flexibility of the barrier film can be maintained, and the impact resistance as a packaging material is sufficiently high or even excellent.

The heat shrinkage rate in the MD direction of the gas barrier film 10B can be adjusted, for example, by controlling the heat shrinkage rate of the film base material 1 by controlling the degree of stretching when stretching the film base material 1 and/or the degree of crystallization due to the heat setting temperature, by the thickness of the barrier layer (layer that includes the metal oxide layer 2 and gas barrier protective layer 3), and the like.

The inventors have found that in polyester film base material as described above, by keeping the tensile elasticity modulus within a specified range, regulating the heat shrinkage rate, and further laminating a barrier layer that includes a metal oxide layer and gas barrier protective film on the surface thereof, a gas barrier film having high hot-water resistance and strength against physical impact, and that is capable of maintaining sufficiently high or even excellent gas barrier properties even when hot-water processing such as boiling processing is performed, can be achieved.

The gas barrier properties can be improved by providing the gas barrier protective layer 3 on the metal oxide layer 2. The gas barrier protective layer 3, by a synergistic effect with the metal oxide layer 2, can exhibit high gas barrier properties, and both layers combine to become a gas barrier layer.

As the gas barrier protective layer 3, the organic protective layer described as an example in the first embodiment can be employed. In other words, the gas barrier protective layer 3 can be formed by applying a coating liquid for forming a protective layer having the composition described below on the metal oxide layer 2, then heating and drying the coating liquid. For example, the coating liquid for forming the protective layer is prepared by adding a component having a formula $(R^1Si(OR^2)_3)n$ ($R^1$ is an organic functional group, and $R^2$ is $CH_3$, $C_2H_5$, or $C_2H_4OCH_3$) to a liquid that includes a water-soluble polymer, one or more kind selected from a group consisting of (a) one or more kind of metal alkoxide and a hydrolyzate of one or more kind of metal alkoxide and (b) tin chloride, and a solvent (water or a water/alcohol mixture).

EXAMPLES

In the following, examples according to the present disclosure will be explained. In the Examples and Comparative Examples described below, analysis and evaluation is performed by the method described below.

[Base Material Film Analysis by a Differential Scanning Calorimeter (DSC)]

By measuring the crystal melting peak of the base material film used in the Examples and Comparative Examples by DSC measurement, the type of polyester resin included in the base material film was confirmed. More specifically, a base material film having an endothermic peak in a temperature range of 235 to 275° C. was determined to include a polyethylene terephthalate resin component, and a base material film having an endothermic peak in a temperature range of 180 to 230° C. was determined to include a polybutylene terephthalate resin component.

[Measurement of Heat Shrinkage Rate]

Measurement of the heat shrinkage rate was performed by heating the gas barrier film of the Examples and Comparative Examples for 30 minutes at 150° C., measuring the length in the machine direction (MD), and calculating by the following formula:

Heat shrinkage rate={(Length before heating−Length after heating)/Length before heating}×100(%)

(Form of Specimens for Evaluation of Permeability and Puncture Strength and Impact Testing)

The measurement of oxygen permeability and water vapor permeability, the evaluation of puncture strength, and impact testing were performed on gas barrier laminates. The gas barrier laminates were prepared as described below using gas barrier films of the Examples and Comparative Examples. First, a two-component curable urethane adhesive agent (A525/A52, manufactured by Mitsui Chemicals, Inc.) was applied to the respective gas barrier films of the Examples and the Comparative Examples, with a dry coating amount of 4.0 g/m². To these films, 70 μm CPP film (ZK207, manufactured by Toray Advanced Film Co., Ltd.) was adhered as a sealant by a dry lamination method to obtain gas barrier laminates.

[Method for Measuring Oxygen Permeability]

Measurement was performed using an OXTRAN 2/20 (manufactured by MOCON, Inc.) under the conditions of 30° C. temperature and 70% relative humidity. The measurement method was based on Japanese Industrial Standard JIS K-7126 method B (equal pressure method), and the measurement values were expressed in the units [cc/m²·day·MPa]. Incidentally, the same measurement was performed three times, and the average value was adopted.

[Method for Measuring Water Vapor Permeability]

Measurement was performed using a PERMATRAN W3/33 (manufactured by MOCON, Inc.) under the conditions of 40° C. temperature and 90% relative humidity. The measurement method was based on Japanese Industrial Standard JIS K-7129, and the measurement values were expressed in the units [g/m²·day]. Incidentally, the same measurement was performed three times, and the average value was adopted.

(Hot-Water Processing)

A5 size pouches were made using the gas barrier laminates of the Examples and Comparative Examples, and 200 g of tap water was put into the pouches and sealed, after which retort processing was performed for 30 minutes at 121° C. After hot-water processing, the tap water content after retort processing was discarded, and measurement was performed in a sufficiently dry state.

[Method for Measuring Puncture Strength]

A needle having a spherical shaped tip (1 mm diameter) was used to puncture the gas barrier laminates of the Examples and Comparative Examples at a speed of 50 mm/minute, and the load at the time of puncture was measured. Incidentally, the same measurement was performed five times and the average value was adopted.

[Impact Testing]

Figure 6:
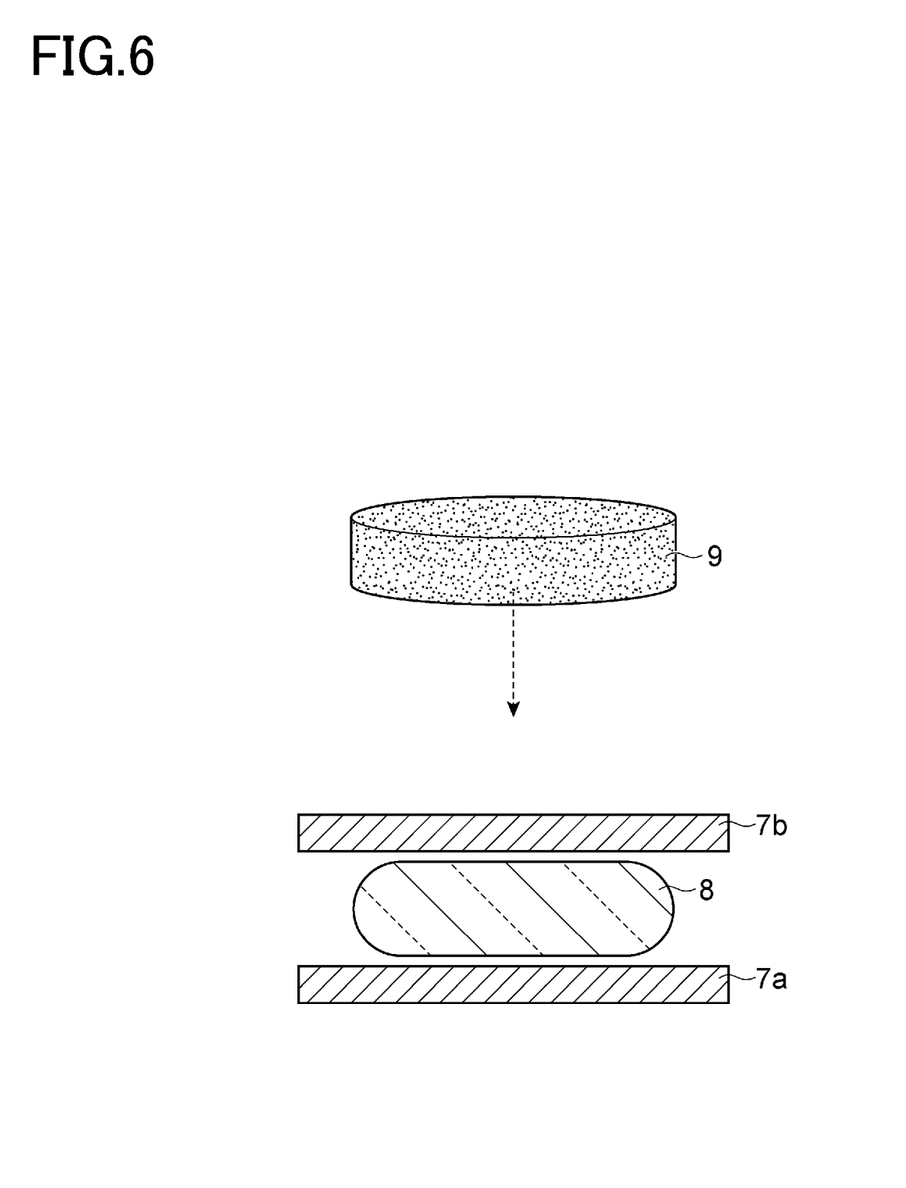
FIG. 6 is a schematic view for explaining an impact test method used in Examples and Comparative Examples in the present disclosure.

Impact testing was performed using an apparatus such as schematically illustrated in FIG. 6. In other words, two flat plates (made of stainless steel SUS 304) having a size of 400 mm×300 mm, thickness of 3.0 mm, and weight of 2.8 kg were prepared. One flat plate 7a was placed flat on the floor surface, and a pouch 8 after retort processing was placed flat on the surface of the flat plate 7a. Then, the other flat plate 7b was placed on top of the pouch 8, and the pouch sandwiched between the two flat plates 7a, 7b was set to stand still. A weight 9 having a weight of 5 kg was allowed to freely fall from a height of 0.8 m toward the flat plate 7b on top of the pouch 8, and as a result, the 5 kg weight added to the weight of the flat plate itself were applied to the entire pouch as an impact. This series of operations was repeated, and the number of times impact was applied until the pouch broke was determined as the impact strength. Incidentally, in Examples 1B to 3B and Comparative Examples 1B to 3B, the impact strength was evaluated as "A" when the number of times that impact was applied before the pouch broke was 10 times or more, evaluated as "B" when the number of times was 6 to 9 times, and evaluated as "C" when the number of times was 5 times or less.

Example 1A

A biaxially stretched polyester film having a thickness of 15 μm was cured with 0.1 g/m² polyester resin as an anchor coat layer; then using an electron beam vacuum deposition method, aluminum was vaporized while introducing oxygen to form an AlOx vapor deposited film having a 10 nm thickness as a metal oxide layer. Furthermore, an organic-inorganic hybrid film in which a hydrolyzate of tetraethoxysilane and polyvinyl alcohol were mixed was formed as a protective layer, and the gas barrier film of Example 1A was obtained.

Example 2A

A biaxially stretched polyester film having a thickness of 15 μm was cured with 0.1 g/m² polyester resin as an anchor coat layer; then using an electron beam vacuum deposition method, silicon oxide was vaporized to form a $SiO_x$ vapor deposited film having a thickness of 25 nm as a metal oxide layer. Furthermore, an organic-inorganic hybrid film in which a hydrolyzate of tetraethoxysilane and polyvinyl alcohol were mixed was formed as a protective layer, and the gas barrier film of Example 2A was obtained.

Example 3A

A biaxially stretched polyester film having a thickness of 15 μm, the heat shrinkage rate of which was adjusted to be lower than the films of Examples 1A and 2A when stretching polybutylene terephthalate film, was cured with 0.1 g/m² polyester resin as an anchor coat layer; then using an electron beam vacuum deposition method, aluminum was vaporized while introducing oxygen to form an $AlO_x$ vapor deposited film having a thickness of 10 nm as a metal oxide layer. Furthermore, an organic-inorganic hybrid film in which a hydrolyzate of tetraethoxysilane and polyvinyl alcohol were mixed was formed as a protective layer, and the gas barrier film of Example 3A was obtained.

Example 4A

A biaxially stretched polyester film having a thickness of 15 μm, the heat shrinkage rate of which was adjusted in the same way as in Example 3A, was cured with 0.1 g/m² polyester resin as an anchor coat layer; then using an electron beam vacuum deposition method, silicon oxide was vaporized to form a $SiO_x$ vapor deposited film having a thickness of 25 nm as a metal oxide layer. Furthermore, an organic-inorganic hybrid film in which a hydrolyzate of tetraethoxysilane and polyvinyl alcohol were mixed was formed as a protective layer, and the gas barrier film of Example 4A was obtained.

Comparative Example 1A

A biaxially stretched polyester film having a thickness of 15 μm, the heat shrinkage rate of which was adjusted to be even lower than the films of Examples 3A and 4A, was cured with 0.1 g/m² polyester resin as an anchor coat layer; then using an electron beam vacuum deposition method, aluminum was vaporized while introducing oxygen to form an $AlO_x$ vapor deposited film having a thickness of 10 nm as a metal oxide layer. Furthermore, an organic-inorganic hybrid film in which a hydrolyzate of tetraethoxysilane and polyvinyl alcohol were mixed was formed as a protective layer, and the gas barrier film of Comparative Example 1A was obtained.

Comparative Example 2A

A biaxially stretched polyester film having a thickness of 12 μm was cured with 0.1 g/m² polyester resin as an anchor coat layer; then using an electron beam vacuum deposition method, aluminum was vaporized while introducing oxygen to form an $AlO_x$ vapor deposited film having a 10 nm thickness as a metal oxide layer. Furthermore, an organic-inorganic hybrid film in which a hydrolyzate of tetraethoxysilane and polyvinyl alcohol were mixed was formed as a protective layer, and the gas barrier film of Comparative Example 2A was obtained.

Comparative Example 3A

A polyester film uniaxially stretched in the MD direction and having a thickness of 15 μm was cured with 0.1 g/m² polyester resin as an anchor coat layer; then using an electron beam vacuum deposition method, aluminum was vaporized while introducing oxygen to form an $AlO_x$ vapor deposited film having a 10 nm thickness as a metal oxide layer. Furthermore, an organic-inorganic hybrid film in which a hydrolyzate of tetraethoxysilane and polyvinyl alcohol were mixed was formed as a protective layer, and the gas barrier film of Comparative Example 3A was obtained.

Comparative Example 4A

A biaxially stretched polyester film having a thickness of 16 μm was cured with 0.1 g/m2 polyester resin as an anchor coat layer; then using an electron beam vacuum deposition method, aluminum was vaporized while introducing oxygen to form an AlOx vapor deposited film having a 10 nm thickness as a metal oxide layer. Furthermore, an organic-inorganic hybrid film in which a hydrolyzate of tetraethoxysilane and polyvinyl alcohol were mixed was formed as a protective layer, and the gas barrier film of Comparative Example 4A was obtained.

[Film Base Material Analysis Results Using a Differential Scanning Calorimeter (DSC)]

The measurement results are shown in Table 1 and Table 2. The PET component means a polyethylene terephthalate resin component, and the PBT component means a polybutylene terephthalate resin component, where "B" indicates that the component is included, "A" indicates that the component is included as the main component (the largest component of a plurality of polyester components), and "-" indicates that the component is not included.

TABLE 1

| Film Base Material | Example 1A | Example 2A | Example 3A | Example 4A |
|---|---|---|---|---|
| Thickness [μm] | 15 | 15 | 15 | 15 |
| Stretching | Biaxial | Biaxial | Biaxial | Biaxial |
| PBT Component | A | A | A | A |
| PET Component | B | B | B | B |

TABLE 2

| Film Base Material | Comparative Example 1A | Comparative Example 2A | Comparative Example 3A | Comparative Example 4A |
|---|---|---|---|---|
| Thickness [μm] | 15 | 12 | 15 | 16 |
| Stretching | Biaxial | Biaxial | Uniaxial | Biaxial |
| PBT Component | A | — | A | — |
| PET Component | B | A | — | A |

The series of measurement results are shown in Table 3 and Table 4.

TABLE 3

|  | Example 1A | Example 2A | Example 3A | Example 4A |
|---|---|---|---|---|
| Film Base Material Thickness [μm] | 15 | 15 | 15 | 15 |
| Metal Oxide Layer | AlOx | SiOx | AlOx | SiOx |
| Heat Shrinkage Rate in MD Direction [%] | 2.3 | 2.3 | 0.9 | 0.9 |

TABLE 3-continued

|  |  | Example 1A | Example 2A | Example 3A | Example 4A |
|---|---|---|---|---|---|
| Oxygen Permeability [cc/m² · day · atm] | Before hot-water processing | 0.08 | 0.08 | 0.06 | 0.07 |
|  | After hot-water processing | 0.7 | 0.5 | 0.4 | 0.4 |
| Water Vapor Permeability [g/m² · day] | Before hot-water processing | 0.5 | 0.4 | 0.6 | 0.6 |
|  | After hot-water processing | 1.5 | 1.5 | 1.1 | 1.0 |
| Puncture Strength [N] |  | 10.6 | 10.8 | 9.0 | 9.0 |
| Impact Testing (No. of times) |  | 13 | 12 | 16 | 15 |

TABLE 4

|  |  | Comparative Example 1A | Comparative Example 2A | Comparative Example 3A | Comparative Example A |
|---|---|---|---|---|---|
| Film Base Material Thickness [μm] |  | 15 | 12 | 15 | 16 |
| Metal Oxide Layer |  | AlOx | AlOx | AlOx | AlOx |
| Heat Shrinkage Rate in MD Direction [%] |  | 0.4 | 0.8 | 3.9 | 0.7 |
| Oxygen Permeability [cc/m² · day · atm] | Before hot-water processing | 0.08 | 0.05 | 0.07 | 0.05 |
|  | After hot-water processing | 1.2 | 0.8 | 1.5 | 0.7 |
| Water Vapor Permeability [g/m² · day] | Before hot-water processing | 3.1 | 0.5 | 0.7 | 0.4 |
|  | After hot-water processing | 4.0 | 1.4 | 4.2 | 1.1 |
| Puncture Strength [N] |  | 8.2 | 6.5 | 11.3 | 7.1 |
| Impact Testing (No. of times) |  | 10 | 4 | 15 | 5 |

As shown in Table 3 and Table 4, in Examples 1A to 4A in which there is biaxial stretching, PBT is the main component, and the heat shrinkage rate in the MD direction of the gas barrier film is less than 3.0%, the barrier properties (oxygen permeability, water vapor permeability) before and after retort processing are good, and the puncture strength is better than the strength of typical PET film. On the other hand, in Comparative Example 1A in which the heat shrinkage rate is 0.6% or less, the barrier properties after heat processing were insufficient, and in Comparative Examples 2A and 4A in which the film base material is PET, even though the barrier properties are good, the puncture strength is insufficient. Moreover, in Comparative Example 3A in which the film base material is uniaxially stretched in the MD direction, the main component is PBT, and the heat shrinkage rate in the MD direction of the gas barrier film is greater than 3%, the oxygen permeability and water vapor permeability become large and the barrier properties decrease.

As described above, in a gas barrier laminate using a gas barrier film according to the present disclosure in which the main component of the film base material is PBT and the heat shrinkage rate in the MD direction is less than 3%, there is no need for the combined use of ONY, the hot water resistance is equivalent to that of a typical gas barrier laminate having a PET film base, and the puncture strength and impact strength are good.

[Measurement of Tensile Elasticity Modulus]

The tensile elasticity modulus of the gas barrier film of the following Examples and Comparative Examples was measured as described below. That is, the tensile elasticity modulus (MPa) was determined by cutting the gas barrier film into a rectangular strip shape having an overall length of 200 mm and width of 15 mm as a test specimen, then attaching the test specimen to a fixed clamp and a movable clamp of a tensile tester (testing apparatus according to Japanese Industrial Standard JIS K71277) with the distance between the clamps being 150 mm; the movable clamp was then moved at a pulling speed of 10 mm/minute and the value of the tensile stress within the tensile proportional limit and the ratio of the strain with respect to that tensile stress were found; this was performed for three test specimens and the average was taken to be the tensile elasticity modulus.

Example 1B

A biaxially stretched polyester film having a 15 μm thickness and including a polybutylene terephthalate component was cured with 0.1 g/m² of polyester resin as an anchor coat layer; then using an electron beam vacuum deposition method, aluminum was vaporized while introducing oxygen to form an $AlO_x$ vapor deposited film having a 10 nm thickness as a metal oxide layer. Furthermore, as a gas barrier protective layer, a coating solution described below was mixed and applied using a bar coater to a thickness of approximately 0.3 μm, then dried for 1 minute in an oven at 120° C. to form a gas barrier protective film, and to obtain the gas barrier film of Example 1B.

(Method for Mixing a Gas Barrier Protective Layer Coating Solution)

The coating solution for the gas barrier protective layer was obtained by mixing a hydrolyzed solution obtained by adding 89.6 g of hydrochloric acid (0.1 N) to 10.4 g of tetraethoxysilane, and hydrolyzing the mixture for 30 minutes until the solid content was 3 wt % (in terms of $SiO_2$) with a 3 wt % water/isopropyl alcohol solution of polyvinyl alcohol {water:isopropyl alcohol=90:10 (weight ratio)}.

Example 2B

A gas barrier film was made in the same way as that of Example 1B using a biaxially stretched polyester film having a thickness of 15 μm, the heat shrinkage rate of which when stretching the base material film was adjusted to be lower than that of Example 1B, to obtain the gas barrier film of Example 2B.

Example 3B

The biaxially stretched polyester film having a 15 μm thickness that was used in Example 1B was cured with 0.1 g/m² of polyester resin as an anchor coat layer; then except for using an electron beam vacuum deposition method to vaporize silicon oxide to form a $SiO_x$ vapor deposited film having a 25 nm thickness as a metal oxide layer, a gas barrier film was made in the same way as that of Example 1B to obtain the gas barrier film of Example 3B.

Comparative Example 1B

Except for using a biaxially stretched polyethylene terephthalate film having a thickness of 12 μm, a gas barrier film was made in the same way as in Example 1B to obtain the gas barrier film of Comparative Example 1B.

Comparative Example 2B

Except for using a biaxially stretched polyamide film having a thickness of 15 μm, a gas barrier film was made in the same way as in Example 1B to obtain the gas barrier film of Comparative Example 2B.

Comparative Example 3B

Except for using a polyester film having a thickness of 15 μm, the heat shrinkage rate in the MD direction of which is adjusted to become large when stretching the base material film, a gas barrier film was made in the same way as in Example 1B to obtain the gas barrier film of Comparative Example 3B.

[Film Base Material Analysis Results Using a Differential Scanning Calorimeter (DSC)]

From the ratio of endothermic peak, it is estimated that the polybutylene terephthalate resin component has a ratio of 60% by mass or greater.

A series of measurement results are shown in Table 5 and Table 6.

TABLE 5

| | | Example 1B | Example 2B | Example 3B |
|---|---|---|---|---|
| Heat Shrinkage Rate in MD Direction [%] | | 2.8 | 2.1 | 2.8 |
| Tensile Elasticity Modulus [MPa] | MD Direction | 2930 | 2658 | 2910 |
| | TD Direction | 2658 | 2430 | 2580 |
| | Average | 2794 | 2544 | 2745 |
| Oxygen Permeability after Hot-water Processing [cc/m² · day · atm] | | 0.8 | 0.9 | 0.7 |
| Impact Testing | | A | A | A |

TABLE 6

| | | Comparative Example 1B | Comparative Example 2B | Comparative Example 3B |
|---|---|---|---|---|
| Heat Shrinkage Rate in MD Direction [%] | | 0.7 | 1.5 | 3.3 |
| Tensile Elasticity Modulus [MPa] | MD Direction | 4320 | 1760 | 2740 |
| | TD Direction | 3997 | 1670 | 2615 |
| | Average | 4159 | 1715 | 2678 |
| Oxygen Permeability after Hot-water Processing [cc/m² · day · atm] | | 0.4 | 6.2 | 5.1 |
| Impact Testing | | C | A | A |

As shown in Table 5 and Table 6, in Examples 1B to 3B in which there is biaxial stretching of the film base material, PBT is the main component, the heat shrinkage rate in the MD direction of the gas barrier film is less than 3.0%, and the tensile elasticity modulus is 2.5 to 3.0 GPa, the barrier properties (oxygen permeability, water vapor permeability) before and after retort processing are good, and the impact strength until breakage of the bag is high. On the other hand, in Comparative Example 1B in which a polyethylene terephthalate film having a tensile elasticity modulus of 4.0 GPa or greater is used, the impact strength is low. Moreover, in Comparative Example 2B in which the film base material is polyamide film, the impact strength is high, but the barrier properties are insufficient. Furthermore, in Comparative Example 3B in which the heat shrinkage rate in the MD direction is greater than 3.0%, the oxygen permeability is large and the barrier properties are reduced.

As described above, in the case of a gas barrier film that uses the gas barrier film according to the present disclosure in which the film base material has PBT as the main component, the heat shrinkage rate in the MD direction is less than 3%, and the tensile elasticity modulus is 2.5 to 3.0 GPa, combined use with ONY is not necessary, the hot-water resistance is equivalent to a typical gas barrier laminate having a PET film base, and the impact strength is good.

INDUSTRIAL APPLICABILITY

The gas barrier film according to the present disclosure has PBT film as the base material, and by forming a laminate having a configuration of a gas barrier layer, an adhesive layer, and a sealant, it is possible to obtain sufficient impact strength even after hot-water processing such as retort processing, boiling processing and the like, and the gas barrier film can be used as packaging material having sufficiently high or even excellent gas barrier properties.

REFERENCE SIGNS LIST

1 . . . Film base material; 2 . . . Metal oxide layer; 3 . . . Gas barrier protective layer; 4 . . . Adhesive layer; 5 . . . Sealant; 6 . . . Unwinding unit; 7a, 7b . . . Flat plate; 8 . . . Pouch; 9 . . . Weight; 10A, 10B . . . Gas barrier film; 20A, 20B . . . Gas barrier laminate.

What is claimed is:

1. A gas barrier film, comprising:
a single layer polyester resin film base material consisting of polybutylene terephthalate or a mixture of polybutylene terephthalate and polyethylene terephthalate with a content of the polybutylene terephthalate in the mixture being 60% mass or more, the polyester resin film base material has a first surface and a second surface, which is opposite to the first surface;
an anchor layer directly on the first surface of the single layer polyester resin film base material;
an $AlO_x$ layer or a $SiO_x$ layer having a thickness of no less than 5 nm and no greater than 100 nm directly on the anchor layer; and
a gas barrier protective layer on the $AlO_x$ layer or on the $SiO_x$ layer, the gas barrier protective layer comprises a hydrolysate of a metal alkoxide and polyvinyl alcohol,
wherein the gas barrier film has a heat shrinkage rate in the machine direction (MD direction) after heating for 30 minutes at 150° C. of 0.6% or more but less than 3.0%, the heat shrinkage rate being represented by the following formula:

Heat shrinkage rate={(Length before heating−Length after heating)/Length before heating}×100(%).

2. The gas barrier film of claim 1, wherein a thickness of the film base material is no less than 6 μm and no greater than 200 μm.

3. The gas barrier film of claim 1, wherein a puncture strength of the film base material is 8.5 N or more.

4. The gas barrier film of claim 1, wherein the metal alkoxide is tetraethoxysilane.

5. The gas barrier film of claim 4, wherein the polyester resin film base material consists of the mixture of polybutylene terephthalate and polyethylene terephthalate.

6. The gas barrier film of claim 5, wherein the heat shrinkage rate in the machine direction (MD direction) of the gas barrier film is from 0.9% to 2.3%.

7. The gas barrier film of claim 1, wherein the anchor layer consists of acrylic urethane resin or polyester polyurethane resin.

8. The gas barrier film of claim 1, wherein the metal alkoxide is tetraethoxysilane and triisopropoxy aluminum.

9. A gas barrier film, comprising:
a single layer polyester resin film base material consisting of polybutylene terephthalate or a mixture of polybutylene terephthalate and polyethylene terephthalate with a content of the polybutylene terephthalate in the mixture being 60% mass or more, the polyester resin film base material has a first surface and a second surface, which is opposite to the first surface;
an anchor layer directly on the first surface of the single layer polyester resin film base material; and
an $AlO_x$ layer or a $SiO_x$ layer having a thickness of no less than 5 nm and no greater than 100 nm directly on the anchor layer; and
a gas barrier protective layer on the $AlO_x$ layer or the $SiO_x$ layer; the gas barrier protective layer comprises a hydrolysate of a metal alkoxide and polyvinyl alcohol,
wherein the gas barrier film has a tensile elasticity modulus within a range of 2.0 to 4.0 GPa, and a heat shrinkage rate in the machine direction (MD direction) after heating for 30 minutes at 150° C. of 0.6% or more but less than 3.0%, the heat shrinkage rate being represented by the following formula:

Heat shrinkage rate={(Length before heating−Length after heating)/Length before heating}×100(%).

10. The gas barrier film of claim 9, wherein the metal alkoxide is tetraethoxysilane.

11. The gas barrier film of claim 9, wherein the anchor layer consists of acrylic urethane resin or polyester polyurethane resin.

12. The gas barrier film of claim 9, wherein the metal alkoxide is tetraethoxysilane and triisopropoxy aluminum.

* * * * *